Figure 1:
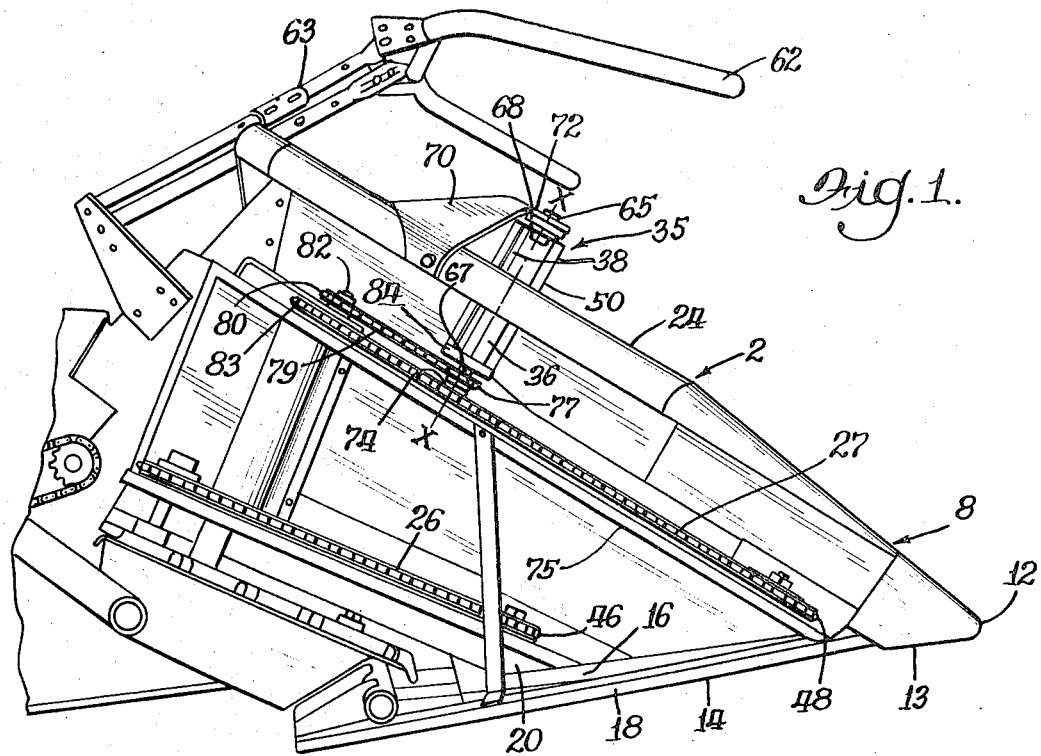

United States Patent [19]
Knapp

[11] 3,803,820
[45] Apr. 16, 1974

[54] POWERED ROTOR FOR ROW CROP HARVESTERS

[75] Inventor: William H. Knapp, Naperville, Ill.

[73] Assignee: International Harvester Company, Chicago, Ill.

[22] Filed: Jan. 10, 1973

[21] Appl. No.: 322,326

[52] U.S. Cl. ................................................. 56/98
[51] Int. Cl. ............................................. A01d 45/02
[58] Field of Search ......... 56/13.5, 13.9, 14.1, 14.2, 56/14.3, 51, 64, 66, 94, 98, 99, 103, 104, 106, 109, 111, 364

[56] References Cited
UNITED STATES PATENTS

| 3,388,538 | 6/1968 | Markham | 56/98 |
| 3,339,354 | 9/1967 | Kessler | 56/98 |
| 3,654,752 | 4/1972 | Segredo | 56/98 |
| 1,758,557 | 5/1930 | Bullock | 146/109 |
| 2,507,540 | 5/1950 | Nolt | 56/364 |
| 908,637 | 1/1909 | Appleby | 56/33 |
| 2,825,197 | 3/1956 | Smith | 56/33 |

FOREIGN PATENTS OR APPLICATIONS

| 1,044,516 | 10/1966 | Great Britain | 56/98 |

*Primary Examiner*—Russell R. Kinsey
*Attorney, Agent, or Firm*—Dennis K. Sullivan; Floyd B. Harman

[57] ABSTRACT

A powered rotor is provided on the cropward divider of a row-crop harvester and is driven at a peripheral speed slightly faster than the speed of the conveyor chain mounted on this divider. The rotor is located intermediate the ends of the divider and projects upwardly with a forward inclination through an inwardly inclined sheet metal panel of the cropward divider. The rotor comprises preferably four equally spaced paddles defining undulant surface area which are effective to shake the stalks which ride up the divider from entanglement with the standing crops in the adjacent row.

6 Claims, 2 Drawing Figures

PATENTED APR 16 1974  3,803,820

POWERED ROTOR FOR ROW CROP HARVESTERS

CROSS REFERENCE TO RELATED APPLICATION

This application is related to an application entitled "POWERED ROTOR FOR ROW CROP HARVESTERS AND STRIPPER BAR THEREFOR", Ser. No. 322,578 filed Jan. 10, 1973, by Donald P. Storm, Ronald F. Zitko, and John D. Segredo and assigned to the assignee hereof.

DISCUSSION OF THE PRIOR ART

As presently known to Applicant, powered rotors or "posts" are known in the art and are positioned at the rear end of the cropward divider in the corner formed between the divider and the transversely extending guide structure which is intended to guide the upper ends of the stalks into the throat of the harvester and prostrate the stalks to enter butt end first. This is exemplified in U.S. Pat. No. 3,388,538 to Markham. It has been found that the position and construction of such prior art posts obtains limited utility. Also closely spaced ribs on the post develop during rotation an essentially continuous peripheral surface which merely abrades the stalk. The placement of the post at the upper rear end of the divider fails to disentangle the stalk from the adjacent row before pulling on the stalk draped over the divider and stripping the corn off the stalk before the stalk is wedged up and into the plant passage of the row crop gathering device.

SUMMARY OF THE INVENTION

This invention is concerned with row crop harvesters for plants such as corn and specifically in the provision of means for disentangling stalks which are bent into adjacent rows of plants.

A general object of the invention is to provide a novel mechanism which shakes the stalks loose and thus disentangles the same from an adjacent row of plants while such stalk is being pulled into the plant passage.

A more specific object of the invention is to provide a novel rotor or post on the cropward divider of a harvester gathering mechanism, the rotor having relatively few peripheral paddles, preferably four or less in number so the paddles and intervening spaces provide an undulating profile during rotation of the rotor.

A further object is to provide such a powered rotor for engagement with a stalk which has its root end portion within the plant passage of the harvester and its intermediate portion draped over the divider and its upper portion entangled in the standing crops in the adjacent row, the rotor rapidly shaking the stalk and thus loosening it from the standing crops and then after loosening the stalk propelling the loosened upper portion of the stalk into the plant passage.

A further object of the invention is to provide a powered rotor on the cropward gathering point of a harvester and position the same normal to the upward and rearward inclination of the divider in an area between the front and rear ends of the gathering point as tests have dictated obtains optimum effectiveness in dislodging stalks from entanglement with plants in an adjacent row.

Figure 2:
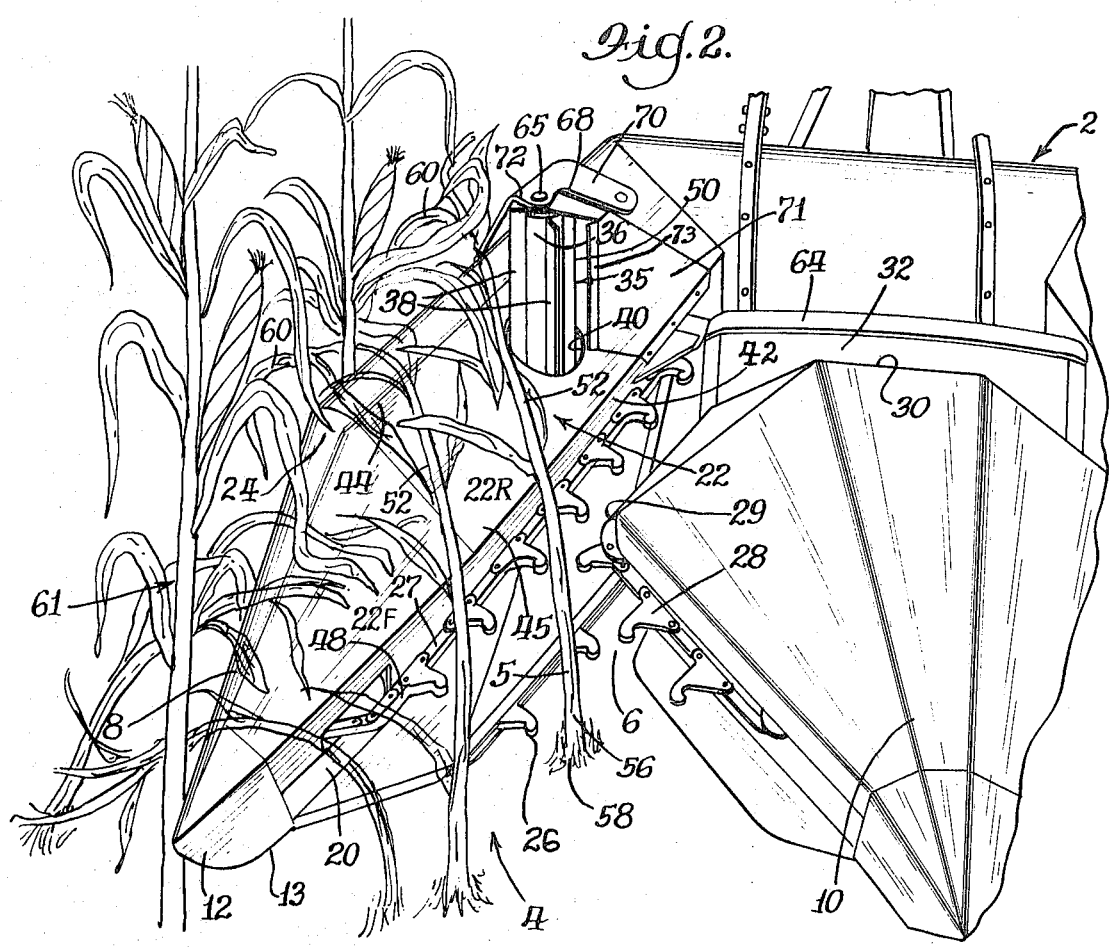

These and other objects and advantages inherent in and encompassed by the invention will become more readily apparent from the specification and drawings, wherein:

FIG. 1 is a side elevational view of a forage harvester gathering head incorporating my novel invention, and FIG. 2 is a fragmentary front perspective view of the structure of FIG. 1.

DESCRIPTION OF THE INVENTION

Having reference to the drawings, there is shown a forage harvesting head generally designated 2 for gathering row crop material such as corn stalks generally indicated at 4 which are planted in rows and are adapted to be aligned with a plant passage 6 defined between an outboard divider 8 and a center divider 10. It will be noted that a two row head is shown; however, the invention is equally applicable to a single row harvester as well as a multirow.

The gathering divider 8 has a forward point 12 with a bottom runner or shoe 13 which is connected to a framework 14. The framework 14 comprises a pair of rearwardly diverging inner and outer beams 16 and 18 interconnected at their forward ends. The inner beam is secured to the lower edge of a generally vertically disposed lower sheet metal panel guide portion 20 of the divider. The upper edge of the portion 20 merges into a lower edge of a diagonal upwardly and laterally extending sheet metal upper guide portion generally designated 22 which terminates in an upper rolled edge portion 24. The diagonal portion 22 comprises a forward section 22F and a rear section 22R. The section 22F diverges cropwardly away from the plant passage 6 and narrows forwardly and merges into the point 12.

The conventional arrangement of chains 26, 27 and 28 are provided on the outboard and center dividers respectively which are adapted to grasp the stalks therebetween and pull them into the cutters (not shown) and guide the cut crops onto a table 30 provided in the present instance on the center divider for delivery therefrom into a throat structure 32 whereat the plants are conveyed to other processing components such as a chopper.

One of the principal features of the instant invention is the provision of a power rotor or post 35 and its positioning intermediate the ends of the outboard divider. The rotor 35 has a core 36 with preferably four axial elongated equally spaced radially extending paddles 38. The rotor extends through an oval shaped opening 40 (FIG. 2) in the diagonal guide portion 22R substantially medially between the upper and lower edges 44 and 45 thereof. As best seen in FIG. 1 the rotor has an axis of rotation normal to the planes of the chains which extend diagonally upwardly and rearwardly from their lower forward ends 46 and 48 which are located adjacent to the ground. The axis of rotation designated X—X of the rotor is inclined upwardly and forwardly and the upper half 50 of the rotor projects above the portion 22R and the uppermost part of the rotor extends above the upper rolled edge 24 as best seen in FIG. 1. The rotor 35 is located approximately medially on the outboard divider 8 and is preferably located such that, when the row crop unit is viewed in its operating position, as shown in the drawings, the top of the rotor 35 will be adjacent to or a short distance rearward of the knee 29 of the center divider 10, that is, the point where the linear direction of the gathering chain 28 changes.

The paddle arrangement provides an effective undulant surface which as the unit travels forwardly agitates or shakes the intermediate portion 52 of a stalk 5 which is draped over the outboard divider, the stalk having its upper end portion 60 entangled in the stalks of the cropward row 61 and its butt end 56 first anchored by its roots 58 to the ground and then severed at the roots 58. The combination of shaking of the entangled stalks and of the forward motion of the unit wedging the outboard divider beneath the stalks, causes such entangled stalks to loosen and be guided into the plant passage. The standing stalks in the row 4 which are aligned with the passage are accommodated for normal passage therethrough, with the upper ends of such stalks being guided by the forwardly divergent prostrating bar 62 which is mounted adjustably from the gathering head framework by a support 63 in a position forwardly and above the divider-interconnecting cross-member 64 of the gathering head.

The power rotor or post 35 is provided at its upper and lower ends with stub shafts 65, 67 connected to respective ends of the core.

The upper stub shaft 65 is mounted in a bearing 68 which is secured to a bracket 70. The bracket 70 is a generally triangular structure in top view and has an apex 72 directly above the power rotor and widens divergingly rearwardly to expose the front and sides of the rotor. At the rear of the bracket it is secured by suitable means such as rivets or bolts to the adjacent portions of the outboard divider. A side sheet 71 having a stripper bar 73 formed on its forward portion is adjustably mounted as by a slotted hole beneath the bracket 70 and extends sidewardly, rearwardly and downwardly to the rear portion of the inward side of divider 8 whereat it is adjustably mounted thereto as by slotted bolt holes. The stripper bar section 73 is preferably formed by bending the forward edge of the side sheet 71 in a direction forward of the side sheet and inward toward the rotor 35. The angled stripping edge thus formed facilitates adjustment of the stripper bar with respect to the rotor when the stripper bar becomes worn. The stripper bar section 73 is preferably reinforced by angle iron and has a stripping edge parallel to and slightly to the rear of the axis of the rotor 35 and is placed in close proximity to the periphery thereof. Thus, as the stalks pass to the inward side of the rotor 35, they are removed therefrom by the stripper bar 73 and guided to the rear by the side sheet 71.

The lower shaft 67 is carried in a bearing 74 which is mounted to a frame structure 75 of the divider framework. Shaft 67 is connected to a sprocket 77 which is driven by a chain 79 from a sprocket 80 which is connected to a shaft 82 which mounts a sprocket 83 for driving the upper chain 27. The shaft 82 is driven in usual manner from a power source either on the harvester or from the towing tractor as well understood in the art. It will be noted that the peripheral speed of the rotor is slightly in excess of the linear speed of the chains such that a shaking motion can be imparted to the stalks engaged thereby. A shield 84 is interposed between the rotor 35 and the sprocket 77 to protect the sprocket from loose material which may slip down the rotor. Preferably, the shield 84 is disposed above the chain 77 and is in the form of an inverted cup having a diameter approximately euqal to that of the paddles 38 mounted to the bottom thereof.

It will be noted that the relationship of the rotor to the crop guide surface on portion 22F is such that a greater portion of the rotor is exposed toward the plant passage than to the adjacent row. Thus the stalks in the row in the passage are engaged at their lower thicker portions. Any plants from the adjacent row which have their head or upper ends draped over the divider will have minimal exposure to the rotor surface and if engaged with the side facing such adjacent row will be thrown forwardly of the divider.

What is claimed is:

1. A row crop gathering head for a forage harvester comprising:

a plurality of dividers defining plant passage means therebetween, one of said dividers having a front end, a rear end, and an upper edge angling upwardly from said front end to said rear end, said one of said dividers providing a crop guiding surface sloping from the adjacent plant passage means laterally diagonally upwardly to said upper edge; and, a powered plant-disentangling rotor having a peripheral undulating surface, said rotor being supported on said one of said dividers approximately medially between the front and rear ends of said divider, said rotor projecting upwardly through said crop guiding surface, said crop guiding surface subtending said rotor in a diagonal plane and exposing a relatively large surface area of the rotor on the passage means side and a small surface area on the opposite side.

2. The invention in accordance with claim 1 and gathering chains mounted on at least one of said dividers, said powered rotor being driven at a peripheral speed exceeding the linear speed of said chain.

3. The invention in accordance with claim 1 and said rotor having a plurality of axially elongated spaced paddles defining a peripheral undulating surface.

4. The invention in accordance with claim 3 and said rotor having a maximum of four paddles.

5. The invention in accordance with claim 1 and the other of said dividers having a knee, the upper portion of said powered post being positioned slightly rearward of said knee.

6. The invention in accordance with claim 1 and said powered motor extending substantially perpendicular to the longitudinal inclination of said divider.

* * * * *